US011188857B1

(12) United States Patent
Hill

(10) Patent No.: US 11,188,857 B1
(45) Date of Patent: Nov. 30, 2021

(54) AUTOMATING FUNCTIONS IN A COMPUTING ENVIRONMENT

(71) Applicant: Amazon Technologies, Inc., Seattle, WA (US)

(72) Inventor: Peter Frank Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1296 days.

(21) Appl. No.: 15/198,305

(22) Filed: Jun. 30, 2016

(51) Int. Cl.
*G06Q 10/06* (2012.01)
*G06F 3/16* (2006.01)
*G06N 20/00* (2019.01)

(52) U.S. Cl.
CPC ....... *G06Q 10/06316* (2013.01); *G06F 3/167* (2013.01); *G06N 20/00* (2019.01)

(58) Field of Classification Search
CPC ... G06Q 10/06316; G06N 20/00; G06F 3/167
USPC .......................................................... 706/46
See application file for complete search history.

(56) References Cited

U.S. PATENT DOCUMENTS

2009/0254336 A1* 10/2009 Dumais .................. G06F 9/451 704/9
2016/0300227 A1* 10/2016 Subhedar ........... H04L 63/1408
2017/0084273 A1* 3/2017 Zohar .................... G10L 15/26

OTHER PUBLICATIONS

Maes et al., "Learning Interface Agents", AAAI-93 Proceedings, 1993 (Year: 1993).*

* cited by examiner

*Primary Examiner* — Tsu-Chang Lee
(74) *Attorney, Agent, or Firm* — Lee & Hayes, P.C.

(57) ABSTRACT

A technology is provided for optimizing compute tasks for performing functions in computer environment. Compute tasks and sub-compute tasks that perform a function within computer environment may be monitored. One or more task patterns may be detected based at least in part on the one or more compute tasks. At least one task patterns is identified as an efficient or alternative compute task pattern to perform the function. An automation option is provided to execute the efficient or alternative compute task pattern to perform the function. Each compute task associated with the efficient or alternative compute task pattern may be automatically executed to perform the function upon acceptance of the automation option.

20 Claims, 9 Drawing Sheets

302

AUTOMATING FUNCTIONS IN A COMPUTING ENVIRONMENT

BACKGROUND

Computing systems may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy applications. For example, some computing systems may act as a service that provides virtual computing, virtual storage, virtual networking and other virtual services as purchased for variable periods or on a pay-per-use basis (e.g., pay for a certain amount of API (application program interface) transactions or bandwidth) from large pools of re-purposable, multi-tenant computing resources or services.

Executing tasks in computing systems or virtual computing environments often uses many tasks or sub-tasks (e.g., operations or entries through a user interface by a user or customer) to perform functions or complete work. Users of computing system often repeat these sequences of events on a regular basis to complete the work that is desired using the computing systems.

DETAILED DESCRIPTION

Figure 1A:
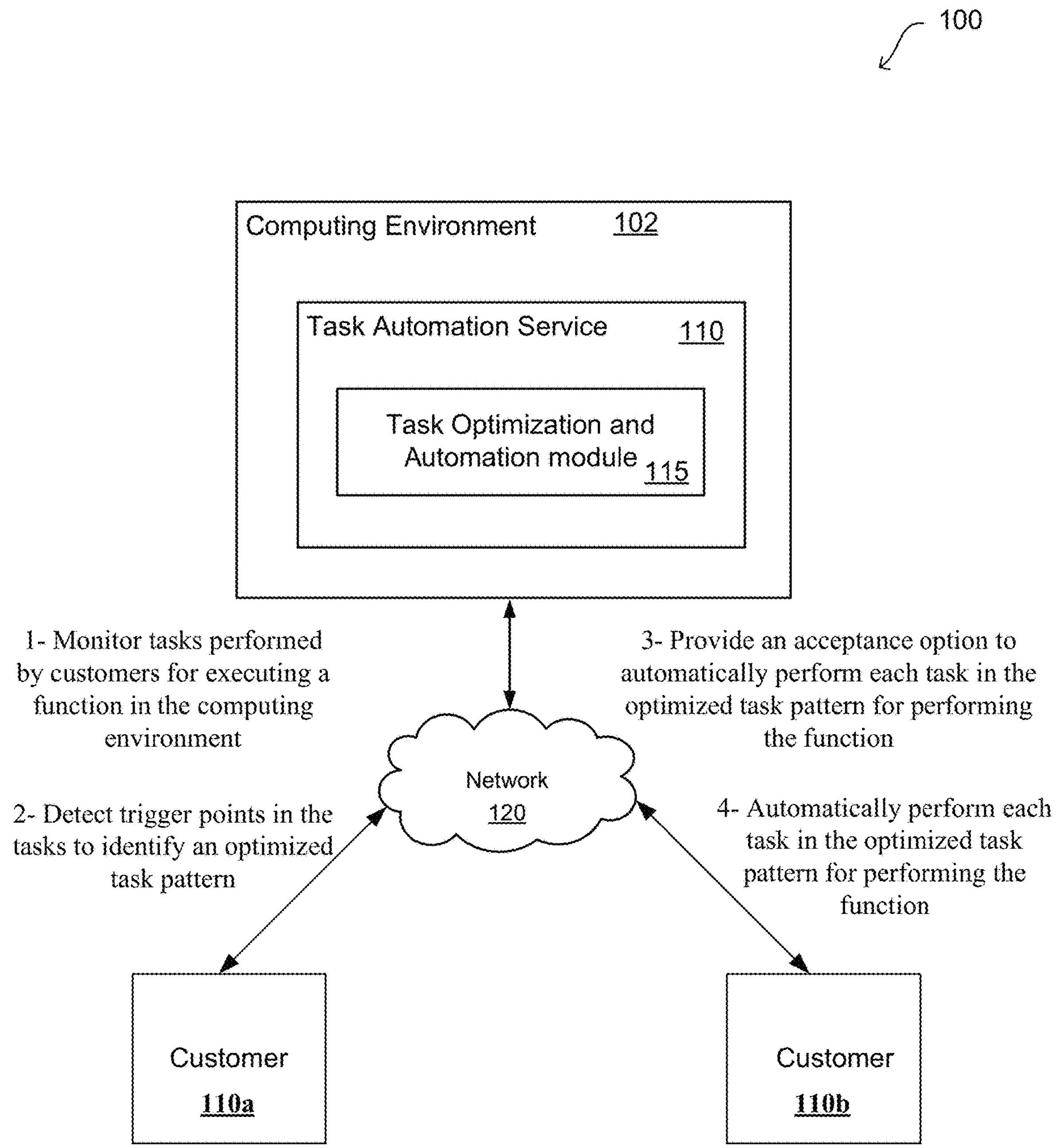
FIG. 1A illustrates a system for executing compute tasks for performing one or more functions in a service provider environment according to an example of the present technology.

The present technology provides for optimizing compute tasks or for finding efficient compute tasks for performing functions in computing environment (e.g., in a service provider environment). In one aspect, a compute task may be an interaction with one or more computer applications and/or computer resources, such as a computer application or resource provided by a service in a multi-tenant computer environment or service provider environment. One or more compute tasks and/or sub-compute tasks that perform a function within a service of the computing environment may be monitored. One or more compute task patterns may be detected according to trigger points that may be used to identify the starting points for compute task patterns containing the one or more compute tasks. At least one task pattern may be identified as an efficient task pattern to perform the function. For example, compute tasks from different users may be monitored and compared, and the efficient task pattern may be identified based on the analysis of the compute task patterns from a group of the users. An automation option may be provided to initiate the execution of the efficient task pattern to perform the function. Each task and/or sub-task associated with the efficient task pattern may then be automatically executed (e.g., executed by playing back previously recorded compute tasks) to perform the function upon acceptance of the automation option. In one aspect, a task can be a process, a piece of work to be performed, an action, a group of user interface events which trigger computing work, and/or a basic unit of a processing that an operating system may control. In one aspect, a task can include one or more sub-compute tasks. A task may also include, but not limited to, using an email program, using a calendaring program, scheduling a meeting, drafting or editing a word processor document or transcript, processing or editing an audio and/or video file, creating a presentation, using a web browser or web service, scheduling and/or arranging travel, purchasing a product or service, booking transportation, using a web site, accessing a data store or database, and/or a combination thereof. For example, a sub-task can be sub-processes or sub-actions taken by a user or customer that are needed to perform a task and/or processes associated with a task needed to perform the task. A function can include one or more compute tasks.

In one example of this technology, many businesses use a computing system to schedule travel arrangements for employees or other personnel. A user or business employee needing to schedule travel may launch a website browser relating to travel. A task automation service may detect that this action of launching a travel website is related to the context of coordinating travel plans and this action can be a defined trigger point. The task automation service may then provide the business employee with an automation option to automate the task of auto populating data into the website browser for a particular candidate. The business employee may select an automation option (which may be displayed on the computing device) to automatically execute a selected task pattern containing the compute tasks and/or sub-compute tasks for performing a function, such as, for example, scheduling travel arrangements. Once the business employee has accepted the automation option, the task automation service may then automate the compute tasks and/or sub-compute tasks for auto populating data into the website browser for the particular candidate and actually making a reservation.

Figure 1B:
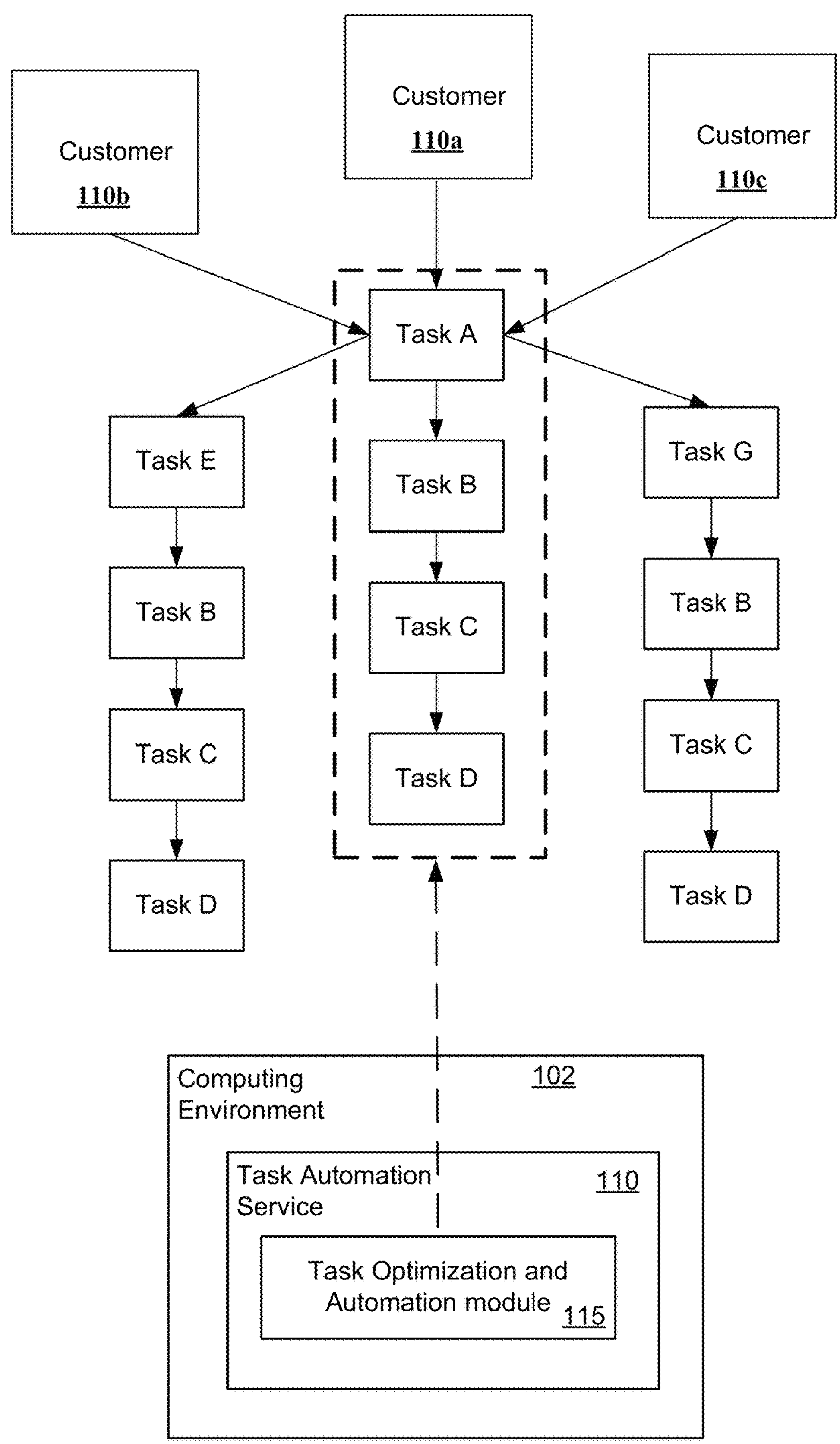
FIG. 1B illustrates the system of FIG. 1A identifying an optimized task pattern for performing one or more functions in the service provider environment.

FIG. 1A illustrates a system 100 for optimizing compute tasks or compute task patterns and making compute tasks more efficient for performing functions in a computer environment according to an example of the present technology. FIG. 1B illustrates the system of FIG. 1A identifying an optimized task pattern for performing one or more functions in the service provider environment. The system 100 may include a computing environment 102 that includes a task automation service 110.

In one aspect, the computing environment 102 may provide virtualized computing services (i.e., virtualized computing, virtualized storage, virtualized networking, etc.) to the task automation service 110. More specifically, the computing environment 102 may include a service provider environment and/or be associated with a service provider environment that provides virtualized computing, virtualized storage, virtualized networking and other virtualized services that are executing on a hardware substrate. Also, the computing environment 102 may provide data communication between the task automation service 110 and one or more customers, such as a first customer 110*a* and/or second customer 110*b* via a network 120, which may include any type of communication network, such as a virtual network that is within the computer environment 102 or other suitable networks, etc.

It should be noted that in one aspect, the task automation service 110 may be included within the computing environment 102 and/or remotely located from the computing environment 102. In addition, the task automation service 210 may include a task optimization and automation module 115. Each user (which may be a considered a "customer"), such as customer 110*a* and/or customer 110*b*, may have user accounts associated with one or more applications associated with the computer environment 102.

In operation, the task optimization and automation module 115 may 1) monitor one or more compute tasks (e.g., a series of compute tasks or compute task patterns) performed by each user (herein after "customer) associated with the computing environment 102, such as customer 110*a* and/or customer 110*b*, to monitor or track the compute tasks or operations associated with specific functions. These monitored compute tasks may be pre-defined and/or may be learned and defined according to machine learning (e.g., by storing compute task patterns and performing task pattern matching, using heuristics, using a state machine, using classification machine learning). For example, a task to schedule travel arrangements may be defined or learned by launching preferred travel website browsers, auto-populating fields in the website from a personal file to schedule the travel, purchase the travel tickets using stored purchasing medium credentials (e.g., credit card information), scheduling a calendar with booked travel information, and/or emailing booked travel arrangements and/or receipts.

In one aspect, the tasks and sub-tasks may be stored using a key-value store, a relational database, an object data store, an object oriented data store, flat files or other useful data stores. Each task may have a task identifier (ID) and each sub-task may also have a sub-task ID. Each sub-task of a task may be associated with the parent task. That is, a sub-task ID may be associated with a parent task ID. In one aspect, a tree structure may be used to associate each subtask (e.g., the subtask ID) with each parent task (e.g., the parent task ID). Other types of directed graphs, undirected graphs, or tree structures may be used for storing the relationships between tasks and/or sub-tasks. Upon performance of a task and/or sub-task, each action item, program interaction (e.g., in a computer application and/or web browser), data entered into the program, operational data, operational metadata, task or sub-task name, parent task ID, sub-task ID, and user ID associated with the task and/or subtask may be stored. The stored information relating to the task and/or subtask may be stored for a selected period of time.

As described herein, machine learning may be an effective tool for use in dynamically learning and defining monitored compute tasks and task optimization and automation. Machine learning may be useful as a method that takes input empirical data, such as data from historical usage patterns, and yields predictions which may be representative of the underlying mechanism or process that resulted in the generation of the data. For example, this technology may receive features representing compute tasks and use those features to classify compute tasks as a specific function type or as being similar to other functions or work processes. Machine learning systems may take advantage of data to capture characteristics of interest having an unknown underlying probability distribution. Machine learning may be used to identify possible relations between observed variables, such compute task or computing interactions. Machine learning in the disclosed technology may also be used to recognize task patterns and make intelligent decisions based on input data. In some examples, machine learning systems may generalize from the available data to produce a useful output, such as when the amount of available data is too large to be used efficiently or practically. As applied to the present technology, machine learning may be used to identify task patterns when a series of compute tasks is captured.

Machine learning may be performed using a wide variety of methods of combinations of methods, such as supervised learning, unsupervised learning, temporal difference learning, reinforcement learning and so forth. Some non-limiting examples of supervised learning which may be used with the present technology include classifiers, regression analysis, AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

The task optimization and automation module 115 may 2) detect trigger points (which may include the existence of defined compute task or sub-compute task that form conditions, states, actions, defined or intended results). In one aspect, a trigger point may be rules, definitions, patterns or conditions used to detect one or more compute tasks or sub-compute tasks which further identify a compute task pattern. The compute tasks or sub-compute tasks may form a signature that identifies a compute task pattern, and the one or more compute tasks or sub-compute tasks may be located at any point in the compute task pattern. In order for a trigger point to be more useful, the trigger points may identify compute task or sub-compute tasks somewhere near the beginning or an initial point of a compute task pattern, and the trigger point may then be used to start the process of offering the compute task pattern to be performed on behalf of the user. Thus, the trigger point is invoked when certain compute task or sub-compute task conditions, states, or actions occur.

For example, a trigger point may be invoked by the action of opening a travel web site (e.g., the compute task may be identified by the trigger point) for a task of purchasing an airline ticket (e.g., the trigger point may be associated with a compute task pattern for the function). As an additional example, a trigger point may be used to activate a compute task pattern for auto populating one or more fields or templates of a web browser with stored or received data relating to the task of purchasing an airline ticket. By way of example only, a trigger point may launch an email program and send an email to confirm a scheduled interview for a candidate employee, upon the scheduled interview for the candidate employee being scheduled in a calendaring program (e.g., the identified compute task or sub-compute task signature or conditions are identified).

Each detected trigger point may be used to start a group of one or more tasks that may be formed into a task pattern. One or more compute task patterns containing compute tasks for functions may be identified and/or detected as an efficient task pattern. That is, each task pattern may be considered a "task execution plan" for performing each group of compute tasks and/or sub-compute tasks of the task pattern for performing an overall function. The compute tasks and/or sub-compute tasks can be business compute tasks performed by in a computing environment, such as, for example, a service provider environment. For example, a task pattern may be emailing business personnel with travel arrangements upon booking of the travel using in the computing environment. A task pattern may be recording a transcript of a conference call, editing a transcript of a recorded conference call, emailing the edited transcript to one or more participants of the transcript, and saving the unedited and edited transcript for a defined period of time. A task pattern may also be scheduling a business meeting with a client using a calendaring program, emailing a confirmation email relating to the scheduled business meeting and sending directions to the location of the scheduled business meeting to a smart phone of each participant traveling to the business meeting. As another example, a task pattern may be automatically placing a telephonic call at a predetermined time to a local food service to order and deliver food and providing a pre-recording message to be played upon the answering the telephonic call or transferring the call to a device of a designated person to place the order in real-time.

The task optimization and automation module 115 may 3) provide an automation option (e.g., a context sensitive menu similar to "right-click" menu, a pop-up menu, or a one-click button which may be provided by an application on a computing device, such as a personal computer or mobile device) to automatically initiate a task pattern and/or even an individual task or sub-task in the efficient task pattern for performing the function. The task optimization and automation module 115 may 3) automatically perform each of the compute tasks in the efficient task pattern for performing the function for the customer, such as customer 110*a* or customer 110*b*, who may accept the automation option (e.g., which may be referred to as a "automate task" button, menu, or pop-up).

In another configuration, the automation service 110 and task optimization and automation module 115 may be executed on a client device that is owned by a customer 110*a*, 11*b*. Then the automation service 110 be in communication with other instances of the automation service 110 on other client devices in a peer-to-peer fashion and data from the other instances of the automation services 110 may be used in identifying efficient compute task patterns.

As depicted in 150 of FIG. 1B, the task automation service 110 may identify a path performed by a first user, such as customer 110*a*, using compute tasks consisting of task A, task B, task C, and task D. The task automation service 110 may identify a path of compute tasks consisting of task A, task E, task B, task C, and task D for another user, such as customer 110*b*. The task automation service 110 may also identify a path of compute tasks consisting of task A, task G, task B, task C, and task D for another user, such as customer 110C. The task automation service 110 may identify that commonality or equivalencies between one or more compute tasks, such as task A, task B, task C, and task D, which are common compute tasks and/or equivalent compute tasks performed by each user (e.g., customer's 110*a-c*) or the task automation service 110 may identify equivalent task patterns. However, one series of compute tasks may be identified as a more efficient task pattern. Thus, the task automation service 110 may recommend task A, task B, task C, and task D be optimized and/or automated. In one example, the task automation service 110 may identify all task patterns starting and ending compute tasks and then recommend a task pattern that is the most efficient, such as, for example, by performing the least amount of compute tasks for a task pattern that may have a common start and common end. In other configurations, equivalent compute task patterns that complete the same or a similar task but which contain different compute task orders, contain some different tasks, or have differences between the compute task patterns may be identified as the same task pattern.

Figure 2:
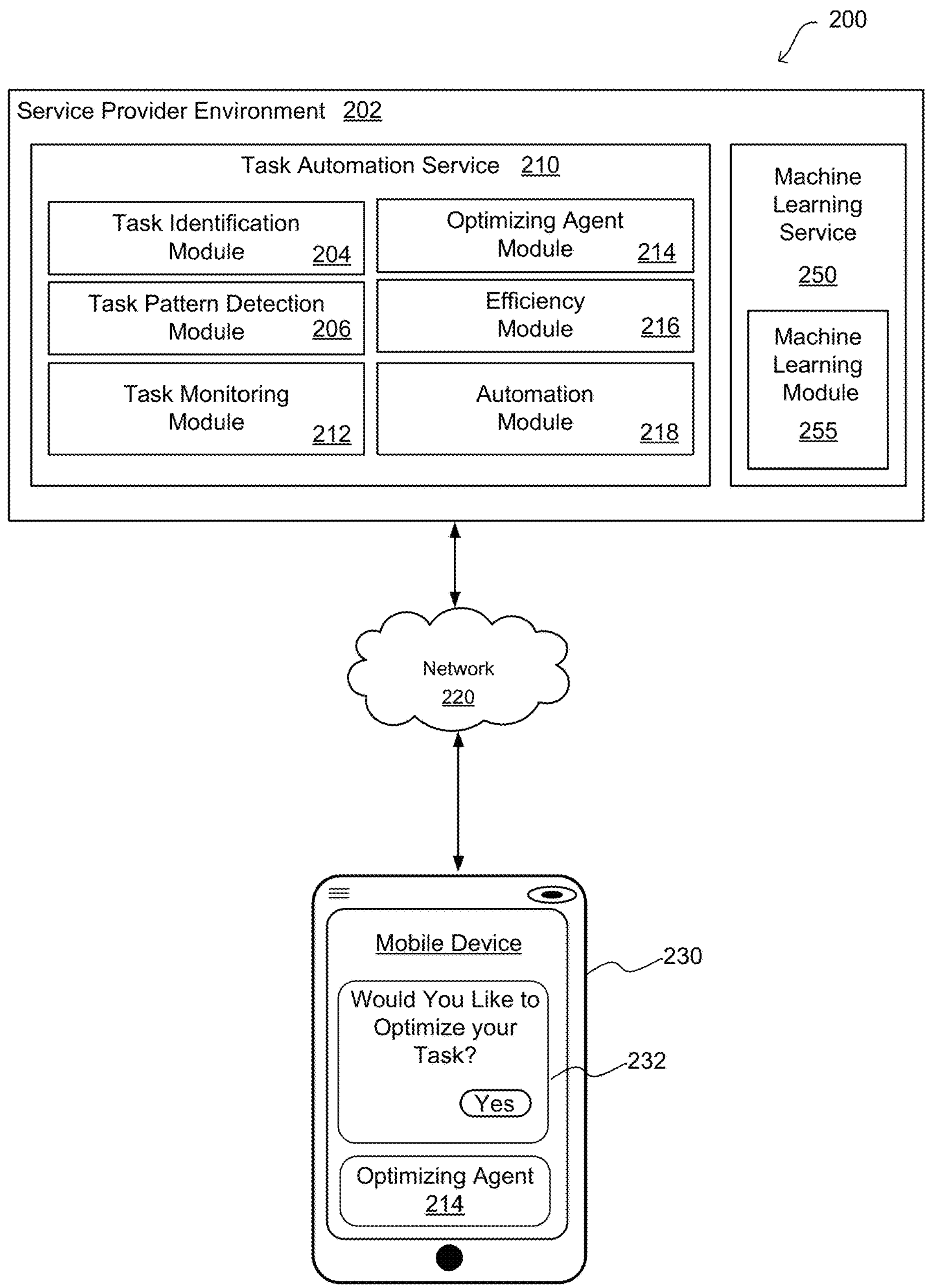
FIG. 2 illustrates an additional system for executing compute tasks for performing functions in a service provider environment according to an example of the present technology.

FIG. 2 illustrates the system 200 for optimizing compute tasks patterns for performing functions in a service provider environment 202. In one aspect, each of the components, modules, and/or functions described in FIG. 1 may also apply to the components, modules, and functions of FIG. 2. Also, one or more of the operations and steps of FIG. 1 may also be included in one or more operations or actions of FIG. 2. Similar to FIG. 1, the system 200 may use or include the computing environment 102 of FIG. 1 or a service provider environment 202 that may also include a task automation service 210 and a machine learning service 250.

The task automation service 210 may be included within the service provider environment 202 and/or remotely located from the service provider environment 202. Also, the machine learning service 250 may be included within the service provider environment 202 and/or remotely located from the service provider environment 202. For example, the task automation service 210 and/or the machine learning service 250 may be on a private computing environment which provides virtualized computing services. In one aspect, the functions may operate within the service provider environment 202 or the functions may operate as independent functions outside of the service provider environment 202.

In one aspect, the task automation service 210 can include a task identification module 204, a task pattern detection module 206, a task monitoring module 212, an optimizing agent module 214 or "optimizing agent" (illustrated as "optimizing agent module 214*a* and/or optimizing agent 214*b* in FIG. 2, herein after "214"), an optimization module 216, and/or an automation module 218. In one aspect, the machine learning service 250 may include the machine learning module 255.

The compute tasks described herein may be collected from a group or community, or the compute tasks may be considered "crowdsourced" compute tasks. Crowdsourcing may refer to identifying one or more compute task patterns via a large scale community (aka a "crowd"), and these compute task patterns may be associated with the service provider environment 202 or the computing environment 102. These compute task patterns may be compute task patterns that are frequently used by one or more devices of a group of users or customer(s) and are collected from one or more users (e.g., "customers") and may work externally and/or internally for the service provider environment 202 or the computing environment of 102. In one aspect, a device may be a desktop computer, a tablet, a smart phone, a server, mobile device, and/or other device that may have one or more processors and/or memory. For example, identifying compute tasks of the devices used by a group of users may be based upon the idea that large numbers of devices (of one or more customers) may act more effectively and accurately than even the best individual (e.g., an "expert"). Compute tasks may be any type of computing compute tasks. In an additional aspect, compute tasks may be general computer-based digital compute tasks, which may include, for example, form entry, ordering, emailing, launching resources, etc. Such compute tasks may also include repetitive tasks such as scheduling of appointments, booking reservations, database entry, launching virtualized services in a service provider environment (e.g., launching computing instances), outlining programming classes, etc. Also, as described herein, compute tasks may include one or more compute tasks that may be used to execute one or more functions provide by the service provider environment 202.

In one aspect, data shared may be anonymized and/or protected depending on the type of task or subtask (e.g., super secret, public, etc.). That is, each task may also include a defined level of security and required level of data protection. In one aspect, one or more different corpuses of other user data may be used according to the required level of security and protection. For example, if an organization or group (e.g., a work group in a business discussing and sharing confidential information) is performing a confidential project or service, each task and/or subtask may be designated as confidential. Thus, the data may not be shared outside the defined organization or designated group. Similarly, suggestions or discussion from each member of the organization or designated group received may be analyzed using a slimmed down set of group data (e.g., only within your group). On the other hand, creating an email and attaching a document or video to the email may be received by the organization or designated group as coming from public data and be shared accordingly. Moreover, depending on the sensitivity of the task, some data may be identified to be shared and used by the public while other data may be identified as to be shared and/or restricted to a private organization or designated group (e.g., for confidential information, it may be publically known that a user used a web browser for sub-task X, but the identity of the web browser may be unknown and the data that was filled into the web browser may also be unknown).

In operation, one or more compute tasks, which may perform a service within the service provider environment 202 or the computer environment of 102 of FIG. 1, may be monitored by the task monitoring module 212. In one aspect, the one or more compute tasks may be monitored using machine-learning executed by the machine learning module 255 to perform one or more overall functions.

One or more compute task patterns may be detected by the task pattern detection module 206 according to one or more trigger points, which may include states, conditions, queries, and/or defined or intended results of the one or more compute tasks. For example, the task pattern detection module 206 may identify a path of compute tasks consisting of task A, task B, task C, and task D for a first user and identify an additional path of compute tasks consisting of task E, task B, task C, and task D for a first user for another user. The task pattern detection module 206 may identify commonality or equivalencies between one or more compute tasks, such as task B, task C, and task D are common compute tasks and/or equivalent compute tasks performed by each user. In one aspect, the task pattern detection module 206 may identify compute task patterns by the starting and ending compute tasks and may recommend a task pattern that is the most efficient, such as, for example, performing the least amount of compute tasks for a task pattern that may have a common start and common end. At least one task pattern may be identified as an efficient task pattern by the task pattern detection module 206 and/or by the efficiency module 216 by identifying one or more of the trigger points to perform the function. For example, the efficiency module 216 may store, maintain, and/or assist in identifying a most current optimized and efficient task pattern for performing a function. In an additional aspect, the compute tasks patterns may be created according to identifying one or more trigger points and then grouping each of the compute tasks to form compute task patterns according to the context of a selected function to be performed. Each task may be grouped into one of the one or more compute tasks patterns by the task pattern detection module 206 and/or by the efficiency module 216. For example, consider that a business employee schedules travel arrangements. The act of launching starting a travel website in a browser, purchasing the travel arrangements, emailing the travel itinerary, storing the receipts, and scheduling the travel itinerary on a calendar may each be identified as initiating trigger points for performing the compute tasks of scheduling travel or executing a portion of the travel plans. Accordingly, each of these trigger points can be grouped together as the trigger points for performing the function of scheduling travels. As such, upon identifying the first trigger point (e.g., launching a travel website browser) each subsequent trigger point may be performed. For example, following completion of the first trigger point being completed, purchasing the travel arrangements according to defined processes, emailing the travel itinerary to both the party for whom the travel arrangements are purchased and a copy to one or more alternative parties, and/or storing the receipts in a personnel file, and scheduling an entry into a calendaring system may be executed.

In one aspect, an automation option 232 may be provided to execute the efficient task pattern to perform the function. For example, the optimization module may send a communication message via network 220 to the mobile device 230 to provide the automation option 232. The automation option may include an audible and/or visible option, such as, for example, a visual display of "would you like to optimize your task?" In one example, a list may pop-up that with two list items such as 1) "Run airplane scheduling for new hire candidates" and 2) "Run airplane scheduling for executive travel". Then the end user may select the task pattern to execute. In another aspect, the automation option 232 may be a one-click "automate task" button for accepting the automation. At least one task and/or subtask, associated with the efficient task pattern, may be automatically executed by the automation module 218 and/or the optimization module 216 to perform the function in the service provider environment 202 upon acceptance of the automation option 232.

In one example aspect, the one or more compute tasks may be defined according to a customer defined specification (e.g., "task 'A' should include emailing all potential job candidates with a date that is entered by the user"). In an additional aspect, the optimizing agent 214 may be associated with one or more customer accounts of the service provider environment 202 and/or with multiple users (customer) of the computer environment of FIG. 1. The optimizing agent 214 may operate within the service provider environment 302 or the functions executed may operate as independent functions outside of the service provider environment 202. For example, the optimizing agent 214 may be included with the task automation service 210. In an additional configuration, the optimizing agent 214, may also be remotely installed one on more computing devices, such as, for example, mobile device 230.

The optimizing agent 214 may be in communication with the machine learning module 255 of the machine learning service 250. Accordingly, the optimizing agent 214 may monitor one or more compute tasks being performed on the mobile device 230 and communicate the monitored data back to the machine learning module and/or the task monitoring module 212. The communicated data may be data that may also be stored for analyzing, storing, optimizing, and automating each task pattern containing compute tasks or sub-compute tasks. In one aspect, the machine learning module 255 may be deactivated according to customer preference. For example, the customer may deactivate the machine learning module 255 and manually define each task that is to be included in a task pattern and performed for a function. However, the optimizing agent 214 may work in conjunction with the machine learning service 250 for collecting, monitoring, and/or learning how to define and/or execute one or more compute tasks for a function.

Alternatively, the machine learning module 255 may also work in conjunction with each customer-defined task. In this way, the machine learning module 255 may have knowledge of each customer-defined task and can learn, identify, detect, and/or suggest new and/or alternative methods, actions, and/or steps for performing one or more compute tasks patterns for a function. That is, aggregated compute task patterns and functions may be optimized. For example, each task may equal one action, such as, for example, launching an application or entering a screen of data. Further, a task pattern may include a plurality of compute tasks and sub-compute tasks.

For example, consider "customer A" and "customer B" using the service provider environment 202 in FIG. 2. The machine learning module 255 and/or the optimized agent 214 may detect that "customer A" performed one or more customer-defined compute tasks, as defined by "customer B", for performing a function in the service provider environment 202. However, the machine learning module 255 identified that "customer A" performed one or more customer-defined compute tasks in less time and/or executed less compute tasks than that of the customer-defined compute tasks performed by "customer B" to arrive at the same function or same amount of work. For example, this could be done by counting the compute sub-tasks, such as by shown in FIG. 1B, counting the sub-task entries in a database, or traversing a tree structure representing a task. For example, referring again to FIG. 1B, sub-tasks A, B, and C, and D performed by customer 110 may be counted as being performed in less time and/or using less sub-tasks of customer 110*b* (e.g., tasks A, E, B, C and D, and customer 110*c* (e.g., tasks A, G, B, C, and D) In this way, the machine learning module 255, in association with the task automation service 210, may learn, identify, and/or suggest an improved and/or optimized way for performing the one or more compute tasks as a combined task pattern. The task automation service 210 may use the data associated with the machine learning module 255 and optimize the task pattern which contains the compute tasks. The task automation service 210 may communicate the efficient task pattern containing multiple compute tasks to customers associated with the service provider environment 202.

Furthermore, at least one task pattern may be identified as an efficient task pattern to execute. The optimizing agent 214 may provide a suggestion 232 on a computing device, such as, for example a mobile device 230, to execute the efficient task pattern to perform the function. In one example, the suggestion 232 may be a hint, suggestion, notification, message, menu, and/or a one-click button for selection. The optimizing agent 214 may also communicate data and/or files relating to one or more compute tasks being performed by the customer to the optimization module 216 via the network 220. The optimization module 216 and/or the automation module 218 may use the data and/or files to optimize each task and execute each task automatically. In one aspect, each of compute tasks and/or sub-compute tasks associated with the efficient task pattern may be automatically executed to perform the function upon acceptance of the suggestion 232.

To further illustrate, consider the following example. In one aspect, an agent may be installed on a computing device, such as, for example, a mobile device (aka "smart phone") of one or more "users". The agent (which may include a "client agent" or "optimizing agent") may include the capability of monitoring each and every activity, user input, task, and/or operation performed on the computing device. Each user may be, for example, a recruiting coordinator for a business organization. As such, each of the compute tasks for performing a function of the recruiting coordinators may be repetitive and reoccurring. For example, the functions for recruiting and hiring a new employee may include: identifying potential candidates, coordinating and making travel plans for the potential candidate, and/or scheduling interviews of the potential candidates.

In one aspect, these compute tasks for performing a function, such as, for example, coordinating travel plans for the potential candidate, and/or scheduling interview of the potential candidates, may be repetitive and pre-defined. Thus, the embodiments as described herein, may take each task and/or sub-task for performing a function, and define a function containing the compute tasks and/or sub-compute tasks (e.g., one or more business processes) as having one or more trigger points. A trigger point may be rules, definitions, patterns or conditionals used to detect one or more compute tasks or sub-compute tasks which further identify a compute task pattern. Each task and/or sub-task can be defined as an operation for performing the particular computing function. In an additional aspect, the operation for performing the particular function by executing compute tasks or sub-compute tasks may be defined by the context of the task pattern, by machine learning and/or by identifying the trigger points. Using the trigger points, one or more compute task patterns may be defined or created therefrom. That is, the compute tasks and/or sub-compute tasks can be grouped into a task pattern that may be performed for each respective function. In one aspect, at least one of the compute task patterns may be identified as an efficient task pattern for a particular function. For example, one of the recruiting coordinators, and/or a machine-learning operation itself, may identify a particular preferred task pattern to execute a particular function by 1) identifying a task pattern that has eliminated one or more of the compute tasks and/or sub-compute tasks, and/or 2) identifying a task pattern that has reduced the time for executing one or more of the compute tasks and/or sub-compute tasks. Alternatively, the task pattern itself may have task eliminated to optimize a number of compute tasks or reduce the amount of time the task pattern takes to execute. In this way, a newly identified task pattern may be compared to a selected task pattern, and/or even compared to a currently used "efficient task pattern". If the newly identified task pattern is more efficient than the selected task pattern, and/or the currently used efficient task pattern, the newly identified task pattern can replace the selected task pattern or the efficient task pattern. Alternatively, the newly identified task can even be offered as an alternative option to the currently used efficient task pattern.

In an additional aspect, the efficient task pattern may be automatically communicated to other recruiting coordinators and automatically be available for use by the other recruiting coordinators. In one aspect, one or more compute task patterns, task hints, alerts, notifications, and/or suggestions may be provided or "broadcast" throughout the group of users for optimizing each function with a task pattern containing task and/or subtask for performing a function. In one aspect, one or more metrics of each task pattern, task and/or sub-task may be tracked, calculated, defined, and/or analyzed for optimizing each task and/or subtask for performing a function. For example, the metrics may include, but are not limited, to statistics collected by the shared knowledge worker group, relative performance characteristics for each user, determining an amount of time for performing each task and/or subtask, tracking or calculating via one or more mathematical operations (e.g., using addition, subtraction, division, multiplication, standard deviations, means, averages, statistical modeling using statistical distributions, etc.) a number of compute tasks and/or sub-compute tasks for performing the function, and/or a rating of how a user is performing as compared to other co-workers (e.g., using a rating of percentages). For example, user #1 may be identified as performing defined compute tasks a, b, and c in less time than user #2 performing the similar compute tasks a, b, and c. As a result, user #2 may be sent, for example, 1) a notification that their performance is 25% less efficient than user #1 (and/or a notification that their performance requires "x" number additional steps more than the average users, where "x" is a positive integer), 2) the compute task patterns using compute tasks and/or sub-compute tasks expected to be performed, 3) compute tasks and/or sub-compute tasks that user #2 should be performing, and/or 4) other data that may be defined by a supervisor and/or learned via the machine-learning. User #2 may also be sent an automation option to select the efficient task pattern to achieve maximum efficiency. Accordingly, user #2 may then either select (via the automation option) to automatically execute the efficient task pattern and/or redefine a new and improved efficient task pattern. In one aspect, each user in a group (e.g., a computing network and/or service provider environment) may be provided information tools, learning tools (e.g., training documents and/or training videos), resources, documents, calendars, web pages (e.g., Internet site domain data), folders, and/or other tools that may be useful for performing the compute task patterns containing the compute tasks and/or sub-compute tasks which are being used by other user in the group.

For example, assume each of the recruiting coordinators is scheduling travel arrangements for the potential candidates. In one aspect, as the user may select an option to automatically execute each task pattern containing the compute tasks and/or sub-compute tasks for performing the function of scheduling travel arrangements. The recruiting coordinator may launch a website browser relating to travel. The task automation service 210 may detect that this action is related to the context of coordinating travel plans for potential candidates and this action is also a defined trigger point. The task automation service 210 may then provide the recruiting coordinator with an automation option to automate the task of auto populating data into the website browser for a particular candidate. The recruiting coordinator may accept the automation option and the task automation service 210 automates the compute tasks and/or sub-compute tasks for auto populating data into the website browser for the particular candidate.

Figure 3:
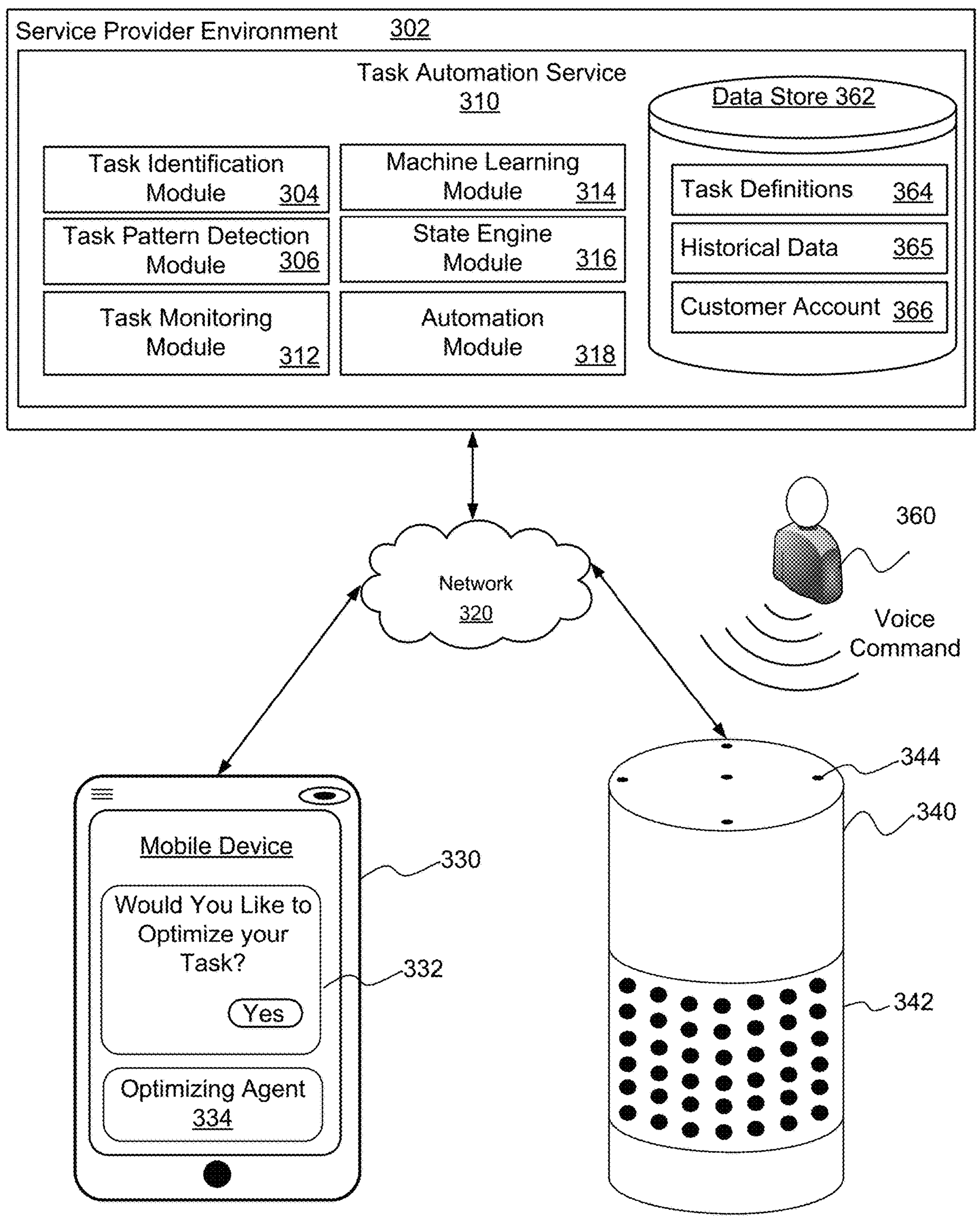
FIG. 3 illustrates a system for executing compute tasks for performing functions in a service provider environment according to an example of the present technology.

FIG. 3 illustrates the system 300 for optimizing compute tasks for performing functions in a multi-tenant computer environment 302, such as a service provider environment 302. In one aspect, each of the components, modules, and/or functions described in FIGS. 1-2 may also apply to the components, modules, and functions of FIG. 3. Also, one or more of the operations and steps of FIGS. 1-2 may also be included in one or more operations or actions of FIG. 3.

The system 300 of FIG. 3 may use or include a service provider environment 302 that may also include a task automation service 310 and a data store 362. The task automation service 310 may include the task identification module 304, the task pattern detection module 306, the task monitoring module 312, a machine learning module 314, a state engine module 316, and/or the automation module 318.

The data store 362 may include one or more task definitions 362, which may be: definitions needed to perform the task, operations to perform the task, or metadata definitions of the task itself as defined by a customer, recorded via an application, recorded by an agent, and/or learned via the machine learning module 314. The data store 362 may also include historical data relating to each executed task. The historical data may include the operation identifier (ID), the operation name, a timestamp, and other information. The data store 362 may also include customer identification (ID) 366 for each customer 360 (e.g., a user) that may be performing a task.

The state engine module 316 may be used to track the state of a client device using a state machine that is built automatically from the historical data 365, as created by an administrator, or using another method. The state machine may be used to identify a trigger point. When a trigger point is identified by a state machine using the state engine module 316, then a task pattern may be suggested to the user or customer for execution.

The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 362, for example, may be associated with the operation of the various applications and/or functional entities described herein.

In one aspect, the task automation service 310 may be in communication with a computing device, such as a mobile device 330, and/or in communication with a voice capturing endpoint 340 via a network 320. The system 300 may include a communication device 330 (e.g., a mobile device), and/or a voice capturing endpoint 340 in communication with the service provider environment 302 via the network 320. In one aspect, the voice capturing endpoint 340 may also include a speaker 342 for relaying one or more communication messages from the service provider environment 302 to the customer 360. The voice capturing endpoint 340 may also include microphones 344 for relaying one or more communication messages to the service provider environment 302 received from the customer 360. The voice capturing endpoint 340 may be any type of electronic device that may capture voice interactions or voice commands (e.g., a mobile device, a laptop, a desktop computer, a tablet, etc.) and forward those commands to other computing devices.

In operation, the customer 360 may define one or more compute tasks according to user-defined workflows of one or more customers (e.g. users) to enable the functions to be automatically executed, such as, for example, defining one or more compute tasks for the users. In one aspect, the optimizing agent 334 may work in conjunction with the machine learning module 314 to also identify, learn, and/or define the one or more compute tasks. That is, each task (including sub-compute tasks) may be collected and monitored using machine-learning via the machine-learning module 315. The machine-learning module 315 may assist with identifying one or more trigger points of each of compute tasks and sub-task. The trigger points may also be defined heuristically. The trigger points may include at least one condition and/or context of each of compute tasks and sub-task. One or more compute tasks patterns can be identified and/or created according to the one or more trigger points or starting points identified for a task pattern. That is, the compute tasks and sub-compute tasks may be grouped into a defined task pattern according to identified trigger points.

In an additional aspect, the task monitoring module 312 and/or the optimizing agent 334 may also monitor the one or more compute tasks requested to be performed by a customer 360. The task pattern detection module 306 may detect compute task patterns based at least in part on one or more compute tasks performed to execute a service in a service provider environment. The task pattern detection module 360 may identify at least one of a plurality of compute task patterns as an efficient task pattern to perform the service or on the mobile device 330. The task automation service 310 may provide to a communication device, such as the mobile device 330 and/or to the voice capturing endpoint 340 a suggestion 332 (as depicted on the mobile device 330) to execute an efficient task pattern to perform the service. In one aspect, the task automation service 310 may transmit the suggestion to the voice capturing endpoint 340 for audible output of the received suggestion. The voice capturing endpoint 340 may then process and audibly communicate the suggestion to the customer 360. The customer 360 may provide voice data (a "voice command") that accepts the suggestion. The voice command may be identified from the data store 362 as being associated with the customer 360 by having authenticated biometric data, such as voice data of the customer. The authenticated biometric data may be the customer ID and/or associated with the customer ID.

If the suggestion is accepted, each task and/or sub-task associated with the efficient task pattern may be automatically executed using the automation module 318 to perform the operations upon acceptance of the suggestion. In one aspect, the automation module 318 may execute the compute tasks associated with the efficient task pattern. For example, all sub-compute tasks and/or trigger points associated with each sub-task that are associated with each task may be identified, executed, and/or performed as part of the execution. The optimization module 319 may also optimize the task pattern by picking a task pattern that is efficient or by pruning a task from a task pattern. Each task pattern, task, and/or sub-compute tasks may be stored in the data store 302 as historical data 365. Also, each identified task pattern, task, and/or sub-task identified as the optimized task pattern, optimized compute tasks, and/or optimized sub-compute tasks may be stored in the data store 302 as historical data 365.

In an additional example, data from the task definitions 364 and data from historical data 365 included in the data store 362 may also be used to optimize compute task patterns, compute tasks, or sub-compute tasks. In an additional example, data from folders, electronic communication, documents, web pages, and/or other resources may be extracted, interpreted, and/or analyzed for optimizing each sub-task and/or task.

Also, each state of a user's actions can be tracked using a state engine 316. Upon reaching a specific point in the state engine 316, a trigger event can be set or triggered.

During the automatic execution of each task, communication messages, such as emails, interface messages, documents, files, or programs, related to the one or more compute tasks associated with an efficient task pattern may be provided to one or more one or more customers 360 (e.g., users). In one aspect, the automation option may be accepted using a voice command from customer 360 using the voice capturing endpoint 340 via microphone 344 to execute the efficient task pattern to perform the service. The voice commanded from the customer 360 may be identified as being associated with a customer account 366 having a customer ID. In an additional aspect, the automation option may be displayed as a selection button 322 (which may include visually displayed data in a display screen associated with the selection button 322 on a computing device) to execute the efficient task pattern to perform the service. The automation option may be accepted using the selection button 332 to execute the efficient task pattern to perform the service.

To more clearly illustrate the embodiments, as described in FIGS. 1-3, consider the following scenario for creating one or more executable items (e.g., compute tasks and/or sub-compute tasks) from within a customer's work context. For a given context of a customer (such as work context), the examples described herein provide a solution for increasing the computing technology productivity space, initially focusing on enabling one or more customers (e.g., users) to be more effective, particularly in a computing environment and/or a service provider environment. For example, many decisions, action items, and/or conditions of a task for performing a function may be made in the context of the customer's working environment, such as in a meeting or email thread. These decisions, action items, and/or conditions are many times not provided to other users, are not tracked, are not documented, and/or are not stored for the tribal knowledge of the team (e.g., the "crowd" in each customer computing environment and/or a service provider environment). In one aspect, "tribal knowledge" may be considered unwritten information that is not commonly known by others (e.g., other customers or other users) within a "crowd", team, organization, computing environment, and/or a service provider environment.

For example, consider a team of users that are in a business meeting using a voice capturing endpoint in meeting room. One or more compute tasks or sub-compute tasks (e.g., action items or follow-up items) may be executed in the computing environment, and/or a service provider environment via the voice capturing endpoint using a voice command. In one example, a knowledge worker may issue a voice command to the voice capturing endpoint (named "Hub" for illustration purposes) using a voice command stating "Hub, please record the business meeting and send a transcript of the last 5 minutes of the business meeting to our patent lawyers for review" or "Hub, please add a task to document the last minutes discussion and make the owner Peter". Accordingly, each action item may be tracked, recorded, monitored, and/or performed according to the voice command. Accordingly, in one aspect, the entire transcript of the conversation within the meeting may be maintained, may be searchable by those knowledge workings with permissions, and/or may also be shared with others. Each task and/or sub-task associated with the voice command may be defined by one or more users.

Accordingly, these task and/or sub-compute tasks may be monitored with one or more trigger points being identified. The compute tasks and sub-compute tasks can be collected into compute task patterns for future use. For example, the voice capturing endpoint may respond to the knowledge worker with an automation option to execute an efficient task pattern to perform each task or sub-task (collectively referred to herein as a "function," "function operation", and/or "operation"). For example, the voice capturing endpoint may respond with "Would you like to optimize recording the business meeting and sending a transcript of the last 5 minutes of the business meeting to our patent lawyers for review" or "Would you like to optimize adding a task to document the last minutes discussion and making the owner Peter?" The knowledge worker may accept the automation option by a second voice command, such as, "Hub, I accept" or "Hub, please optimize and automatically execute each request". In other words, the automation option may be one of a variety of commands that may be defined and when accepted may execute a task pattern.

As an additional example, consider the scenario within an email, messaging platform, or other text-based communication form. In one aspect, the acceptance button may be provided (e.g., such as on a visual display of computing device, such as a laptop or mobile device) that may allow the knowledge work to "one-click" (e.g., select only one time the acceptance button) to create a task from within the context of the messaging tool. For instance, within an email, a knowledge working may highlight a portion of the text, click the displayed acceptance button (which may also be called a "task creator" to create a task), and assign each action item of the task or sub-task to an owner and a date and if desired form compute task patterns. A task automation service may assign ownership of a portion of the document to be owned and/or worked on by another individual in a truer collaborative form. Accordingly, these task and/or sub-compute tasks may be monitored with one or more trigger points being identified. Also, the task automation service may have identified each of these compute tasks (e.g., creating a task and assigning the owner and the date) from a defined operation for performing the task and/or from machine-learning and automatically execute the collection of the compute tasks.

Figure 4:
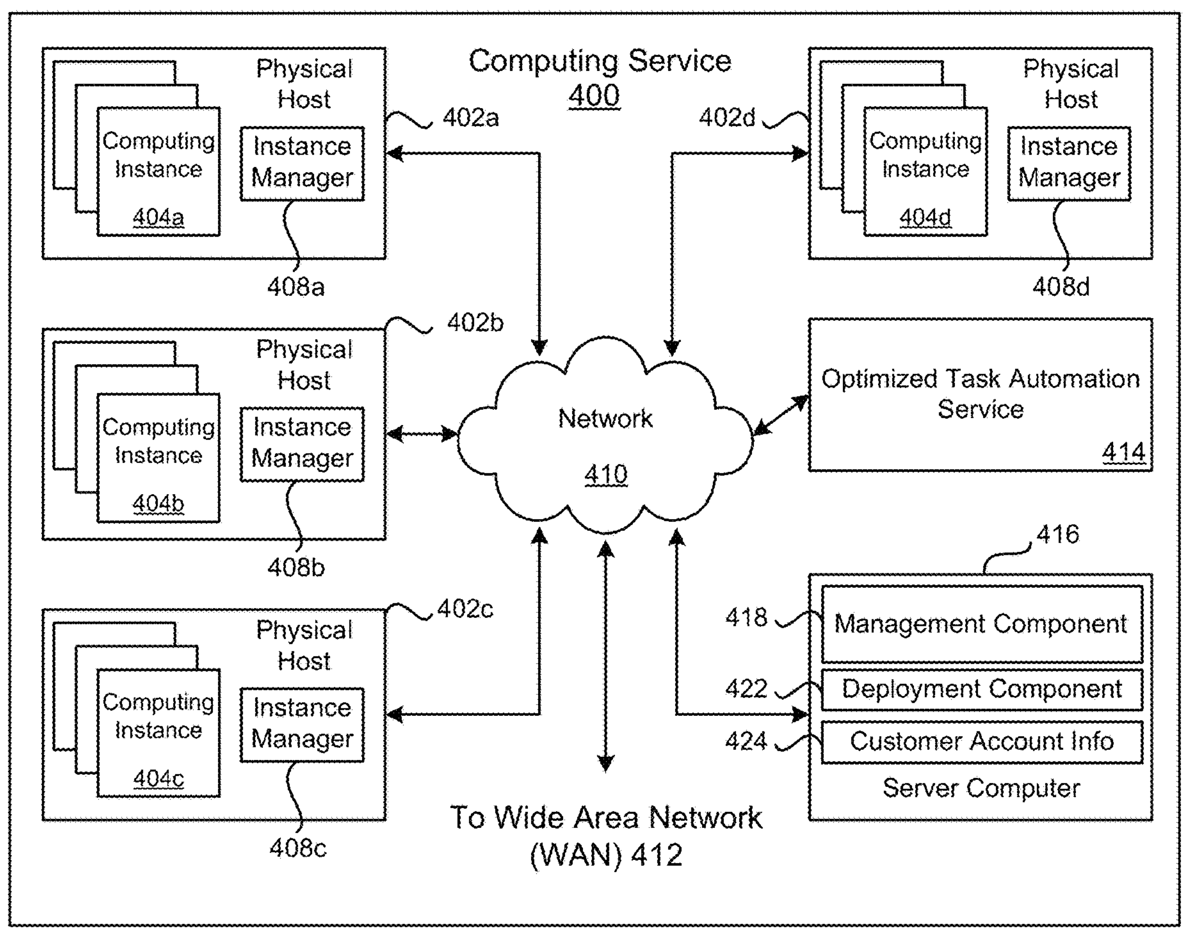
FIG. 4 is a block diagram that illustrates an example computing service environment that includes a task automation service according to an example of the present technology.

FIG. 4 is a block diagram illustrating an example computing service 400 that may be used to execute software services for optimizing compute tasks for performing functions in a computing service environment. In particular, the computing service 400 depicted illustrates one environment in which the technology described herein may be used. The computing service 400 may be one type of environment that includes various virtualized service resources that may be used, for instance, to host computing instances 404*a-d* on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402*a-d*. While four server computers are shown, any number may be used, and large data centers may include thousands of server computers. The computing service 400 may provide computing resources for executing computing instances 404*a-d*. Computing instances 404*a-d* may, for example, be virtual machines. A virtual machine may be an instance of a software implementation of a machine (i.e., a computer) that executes applications like a physical machine. In the example of a virtual machine, each of the server computers 402*a-d* may be configured to execute an instance manager 408*a-d* capable of executing the instances. The instance manager 408*a-d* may be a hypervisor, virtual machine monitor (VMM), or another type of program configured to enable the execution of multiple computing instances

404*a-d* on a single server. Additionally, each of the computing instances 404*a-d* may be configured to execute one or more applications.

Some of the servers may be used for executing a service message request rate management operation service (e.g., service message rate throttling or auto-scaling operation service). For example, a server computer 414 may execute an application for optimizing compute tasks for performing functions according to an example of the present technology.

One or more server computers 416 may be reserved to execute software components for managing the operation of the computing service 400 and the computing instances 404*a-d*. A server computer 416 may execute a management component 418. A customer may access the management component 418 to configure various aspects of the operation of the computing instances 404*a-d* purchased by a customer. For example, the customer may setup computing instances 404*a-d* and make changes to the configuration of the computing instances 404*a-d*.

A deployment component 422 may be used to assist customers in the deployment of computing instances 404*a-d*. The deployment component 422 may have access to account information associated with the computing instances 404*a-d*, such as the name of an owner of the account, credit card information, country of the owner, etc. The deployment component 422 may receive a configuration from a customer that includes data describing how computing instances 404*a-d* may be configured. For example, the configuration may include an operating system, provide one or more applications to be installed in computing instances 404*a-d*, provide scripts and/or other types of code to be executed for configuring computing instances 404*a-d*, provide cache logic specifying how an application cache may be prepared, and other types of information. The deployment component 422 may utilize the customer-provided configuration and cache logic to configure, initialize, and launch computing instances 404*a-d*. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402*a-d*, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
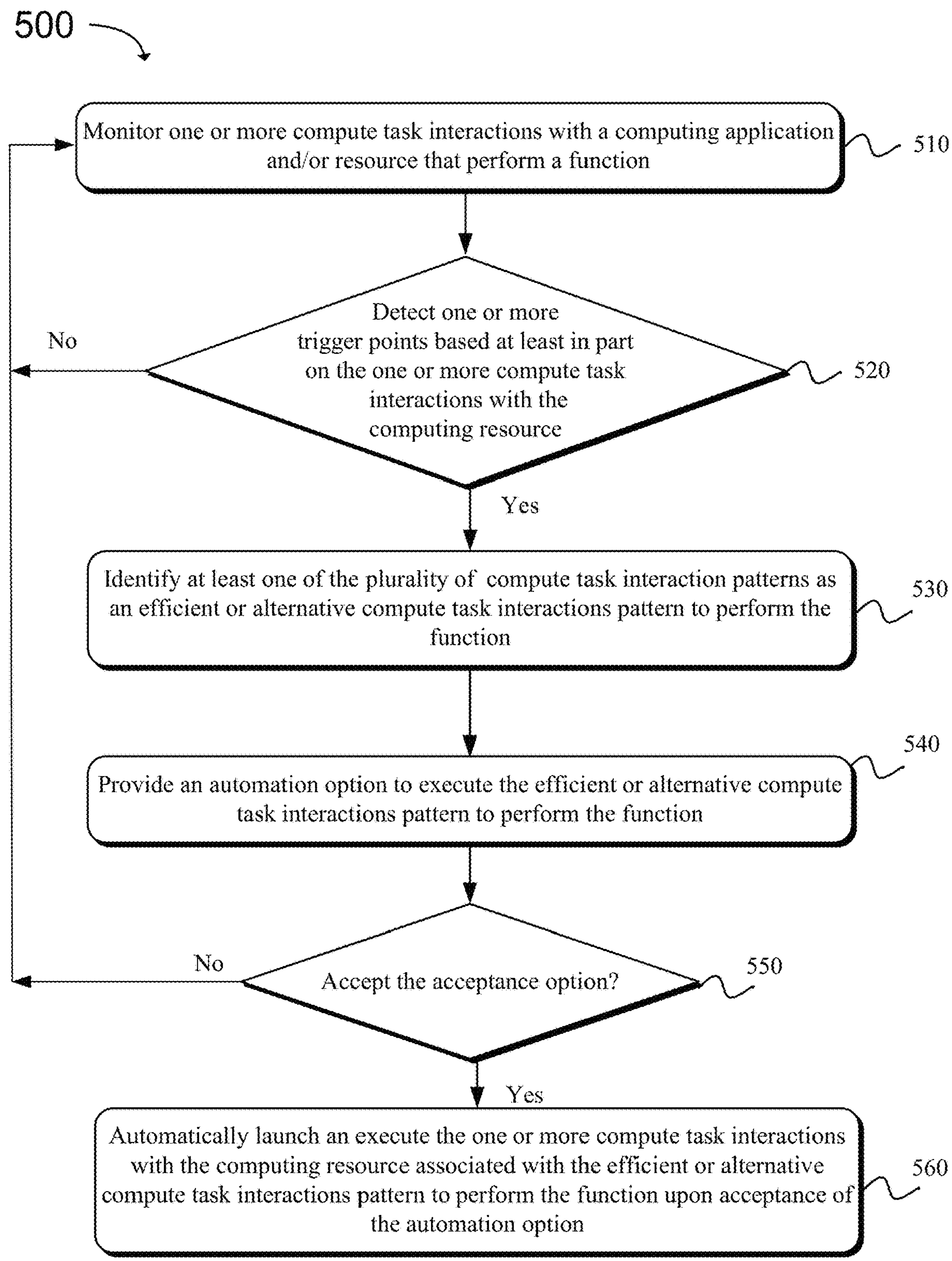
FIG. 5 is a flowchart of an additional example method for executing compute tasks for performing functions in a service provider environment according to an example of the present technology.

FIG. 5 is a flowchart of an example method 500 for optimizing compute tasks for performing functions according to an example of the present technology. The functionality 500 may be implemented as a method and executed as instructions on a machine, where the instructions are included on at least one computer readable medium or one non-transitory machine-readable storage medium. For example, starting in block 510, one or more compute tasks that perform a function, for example using a local email program or an application within service of a multi-tenant computer environment, may be monitored. A determination may be performed to determine whether one or more trigger points are detected to form compute task interaction patterns based at least in part on one or more compute task interactions with the computing resource, as in block 520. If no, the method 500 may return to step 510. If yes, the method 500 may move to block 530. At block 530, at least one of the compute task interaction patterns may be identified as an efficient or alternative compute task interactions pattern to perform the function. An automation option is provided to execute the efficient or alternative compute task interactions pattern to perform the function, as in block 540. In one aspect, one or more users in a computing environment may be provided with notification of the efficient or alternative compute task interactions pattern that has been identified. At block 550, a determination is performed to determine whether the automation option has been accepted. If no, the method 500 may move back to block 510. If yes, the method 500 may move to block 560. At block 560, each of the compute task interactions (e.g., compute tasks) with the computing resource associated with the efficient or alternative compute task interactions pattern may be automatically launched to perform the function upon acceptance of the automation option.

Figure 6:
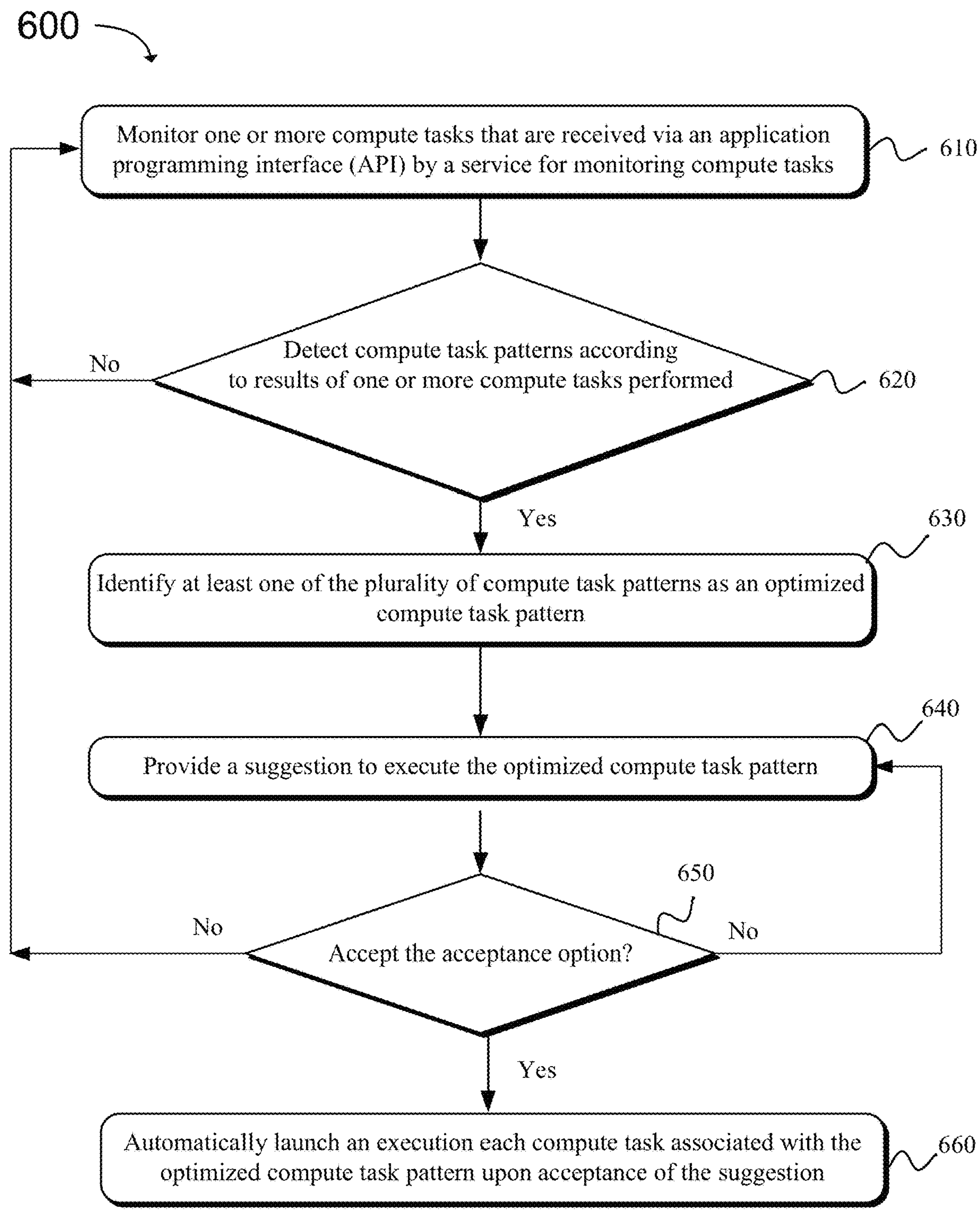
FIG. 6 is a flowchart of an additional example method for executing compute tasks for performing functions in a computer environment according to an example of the present technology.
Figure 7:
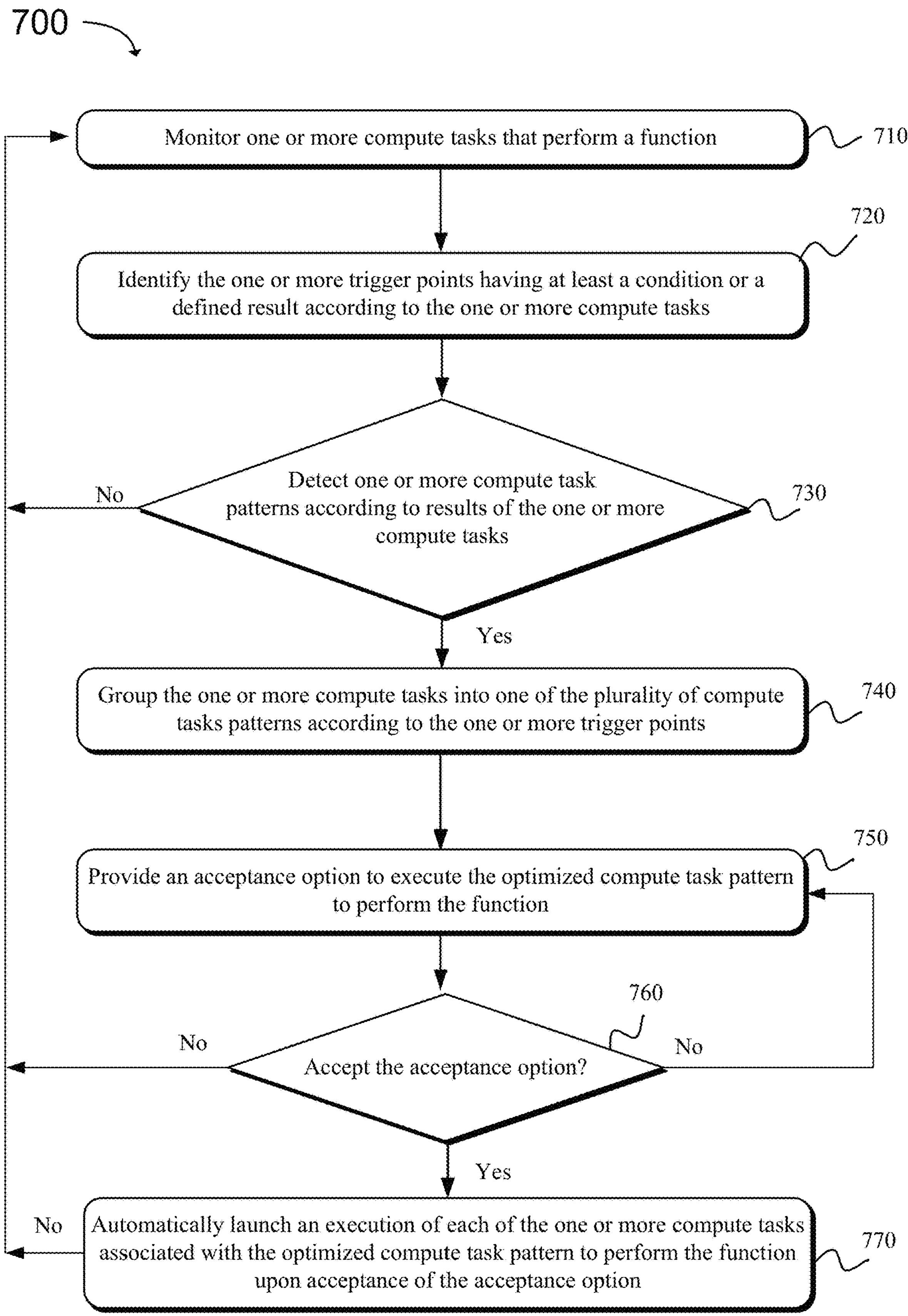
FIG. 7 is a flowchart of an additional example method for executing compute tasks for performing functions in a service provider environment according to an example of the present technology.

FIG. 6 is a flowchart of an additional example method 600 for optimizing compute tasks for performing functions in a computing environment according to an example of the present technology. The functionality 600 may be implemented as a method executed as instructions on a machine, where the instructions are included on at least one computer readable medium or one non-transitory machine-readable storage medium. Starting in block 610, one or more compute tasks may be monitored that are received via an application programming interface (API) by a service for monitoring compute tasks. The compute task patterns may be compute interactions with a computing application and/or a computing resource, executed on a local computing resource or by a service in the multi-tenant computing environment. In one aspect, the service may include an agent that may monitor the one or more compute tasks. Alternatively, the agent may be installed on a device that is associated with the service to monitor the one or more tasks. A determination may be performed to identify whether compute task patterns are detected based at least in part on of one or more previously detected compute tasks (which may be the same compute tasks but performed by different users/customers) that are performed, as in block 620. That is, one or more compute task patterns may be identified from a plurality of compute tasks performed by one or more customers for performing the same function. If no, the method 600 may return to step 610. If yes, the method 600 may move to block 630. At block 630, at least one of the plurality of compute task patterns may be identified as an efficient or alternative compute task pattern. A suggestion may be provided to execute the efficient or alternative compute task pattern to perform the function, as in block 640. A determination may be performed to decide whether the automation option has been accepted, as in block 650. If the automation option has not been accepted, the method 600 may return to step 610 or 640. It should be noted that the method may move to block 640 to provide N number of additional suggestion (e.g., a second suggestion that may be similar and/or different to a first suggestion), where N may be a positive integer. If the suggestion has been accepted, the method 600 may move to block 660. At block 660, the technology may automatically launch an execution of each compute task associated with the efficient or alternative compute task pattern to perform the function upon acceptance of the suggestion FIG. 7 is a flowchart of an example method 700 for optimizing compute tasks for performing functions according to an example of the present technology. The functionality 700 may be implemented as a method and executed as instructions on a machine, where the instructions are included on at least one computer readable medium or one non-transitory machine-readable storage medium. For example, starting in block 710, one or more compute tasks that perform a function within a service of a computing environment, such as, for example service provider environment, may be monitored. The monitoring may be performed by an agent of the service. The agent may be installed on a device that is in association with the service. One or more trigger points having at least a condition according to the one or more compute tasks may be identified, as in block 720. A determination may be performed to determine whether one or more of the compute task patterns are detected according to the one or more trigger points of the one or more compute tasks, as in block 730. If no, the method 700 may return to step 710. If yes, the method 700 may move to block 740. At block 740, at least one compute task may be grouped into one of the one or more compute tasks patterns according to the one or more trigger points. An automation option may be provided to execute the efficient task pattern to perform the service, as in block 750. A determination may be performed to determine whether the automation option has been accepted, as in block 760. If the automation option has not been accepted, the method 700 may return to step 710 or 750. The operations may move to block 750 to provide N number of additional suggestions (e.g., a second or third suggestion that may be similar and/or different to a first suggestion), where N may be a positive integer. If the suggestion has been accepted, the operations may move to block 770. At block 770, each of the compute tasks associated with the efficient compute task pattern may be automatically executed to perform the function upon acceptance of the automation option.

In one aspect, in conjunction with and/or as part of at least one block of FIGS. 5-7, the operations of 500, 600, and/or 700 may include each of the following. The operations of 500, 600, and/or 700 may include monitoring one or more compute tasks as requested by one or more user's devices to the service via an API in order to perform the function in the service provider environment. Each of the one or more compute tasks may be defined according to user-defined workflows of the devices (which may be associated with one or more users or peers in the multi-tenant environment) to enable the functions to be automatically executed, and/or defined according to a machine-learning.

The operations of 500, 600, and/or 700 may include providing to one or more one or more user's devices in the multi-tenant environment at least one of documents, files, or programs, related to the one or more compute tasks associated with the efficient task pattern. An automation option may be presented and accepted using a voice command captured at a voice capturing endpoint to execute the efficient or alternative compute task pattern to perform the function. The voice command may be identified as being associated with a customer account.

The operations of 500, 600, and/or 700 may include providing the automation option as a graphical user interface (GUI) selection option on a device to execute the efficient compute task pattern to perform the function in a service, and then enabling the acceptance of the automation option using the selection button to execute the efficient compute task pattern to perform the function. In an additional aspect, the operations of 500, 600, and/or 700 may include monitoring the one or more compute tasks using machine-learning to perform the function, and identifying one or more trigger points of each of the one or more compute tasks, wherein the trigger points include at least a condition or a defined result of the one or more compute tasks. In addition, the plurality of compute tasks patterns may be created according to the one or more trigger points.

In one aspect, the service provider environment may include one or more services executing on computing instances, servers or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 8:
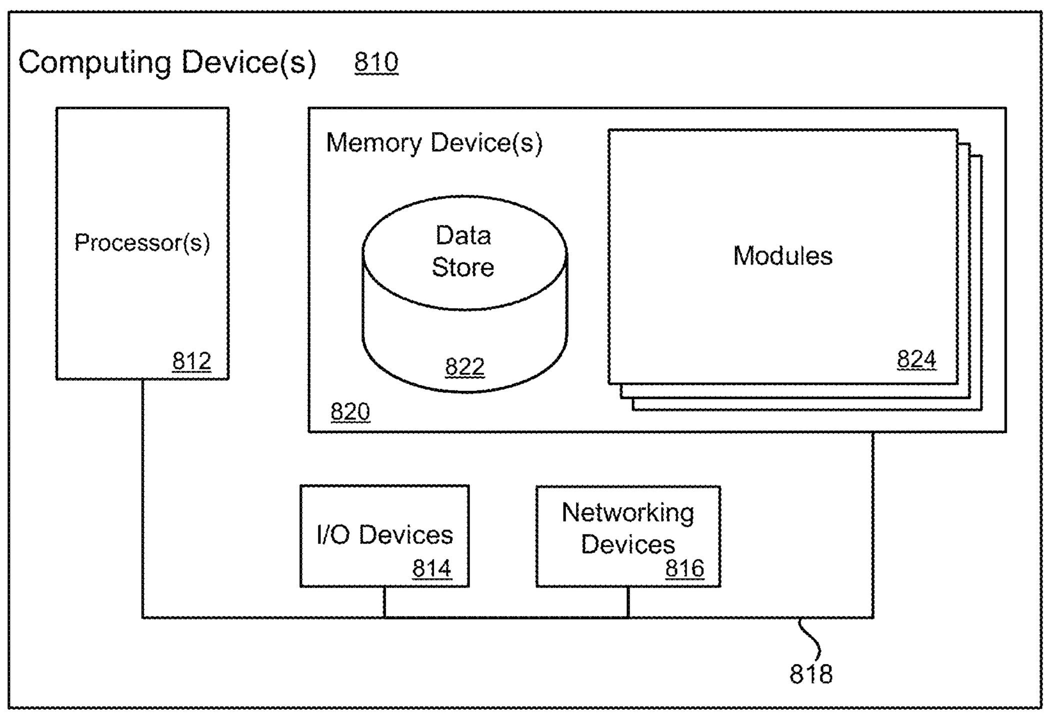
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the Internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid-state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:

a processor; and a memory storing executable instructions that, when executed by the processor, cause the system to:

determine a trigger event indicating initiation of a computing function;

receive, from one or more user devices, one or more first compute task interactions with at least one computing resource defining a first compute task interactions pattern for performing the computing function;

receive, from the one or more user devices, one or more second compute task interactions with the at least one computing resource defining a second compute task interactions pattern to perform the computing function;

determine a first metric associated with the one or more first compute task interactions is less than a second metric associated with the one or more second compute task interactions, the first metric including a first number of the one or more first compute task interactions, and the second metric including a second number of the one or more second compute task interactions;

identify, based at least in part on the first metric being less than the second metric, the first compute task interactions pattern as an efficient compute task interactions pattern to perform the computing function;

provide an automation option to execute the efficient compute task interaction pattern to perform the computing function; and enable execution of the efficient compute task interaction pattern to perform the computing function.

2. The system of claim 1, wherein the executable instructions, when executed by the processor, further cause the system to:

define the first compute task interactions pattern according to user-defined workflows; or define the first compute task interactions pattern using machine-learning.

3. The system of claim 1, wherein the one or more first compute task interactions are associated with at least one customer account of a service provider environment.

4. The system of claim 3, wherein the executable instructions, when executed by the processor, further cause the system to provide, to one or more peers associated with the at least one customer account, at least one of documents, files, or programs related to the one or more first compute task interactions.

5. The system of claim 1, wherein the executable instructions, when executed by the processor, further cause the system to:

enable acceptance of the automation option by a voice command executed at a voice capturing endpoint to execute the efficient compute task interactions pattern, wherein the voice capturing endpoint is associated with a customer account; or provide the automation option as a graphical user interface (GUI) selection option to execute the efficient compute task interactions pattern.

6. The system of claim 1, wherein the executable instructions, when executed by the processor, further cause the system to:

monitor the one or more first compute task interactions with the at least one computing resource by using machine learning, wherein identifying the first compute task interactions pattern as the efficient compute task interactions pattern is based at least in part on the machine learning.

7. A system comprising:

a processor; and a memory storing executable instructions that, when executed by the processor, cause the system to:

receive a plurality of compute tasks via an application programming interface (API) of a service in a multi-tenant computing environment, wherein the plurality of compute tasks include interactions with an application;

detect a first compute task pattern for performing a computing function of the application based at least in part on the plurality of compute tasks;

detect a second compute task pattern for performing the computing function of the application based at least in part on the plurality of compute tasks;

determine that the first compute task pattern includes less compute tasks than the second compute task pattern;

identify, based at least in part on the first compute task pattern including less compute tasks than the second compute task pattern, the first compute task pattern as an efficient compute task pattern to perform the computing function;

provide a suggestion to execute the efficient compute task pattern to perform the computing function; and enable execution of one or more compute tasks of the plurality of compute tasks associated with the efficient compute task pattern to perform the computing function.

8. The system of claim 7, wherein the executable instructions, when executed by the processor, further cause the system to determine the first compute task pattern based at least in part on user-defined workflows of users.

9. The system of claim 7, wherein the executable instructions, when executed by the processor, further cause the system to define the plurality of compute tasks using machine learning.

10. The system of claim 9, wherein the executable instructions, when executed by the processor, further cause the system to provide, to one or more user devices at least one of documents, files, or programs related to the efficient compute task pattern.

11. The system of claim 7, wherein the executable instructions, when executed by the processor, further cause the system to accept an automation option using a voice command executed at a voice capturing endpoint to execute the efficient compute task pattern, wherein the voice command is associated with a customer account.

12. The system of claim 7, wherein the executable instructions, when executed by the processor, further cause the system to:

provide an automation option as a graphical user interface (GUI) control to execute the efficient compute task pattern; and receive acceptance of the automation option to execute the efficient compute task pattern to perform the function.

13. The system of claim 7, wherein the executable instructions, when executed by the processor, further cause the system to:

monitor the plurality of compute tasks using machine learning;

identify one or more trigger events of the plurality of compute tasks indicating one or more starting points for at least one of the first compute task pattern or the second compute task pattern; and detect the first compute task pattern or the second compute task pattern based at least in part on the one or more trigger events.

14. At least one non-transitory machine readable storage medium storing executable instructions that, when executed, cause a system to:

monitor one or more compute tasks that perform a computing function, wherein the one or more compute tasks comprise interactions from a plurality of user devices with at least one of a computing application or a computing resource;

determine one or more trigger events associated with the one or more compute tasks;

determine a plurality of compute task patterns based at least in part on the one or more compute tasks and the one or more trigger events;

identify a particular compute task pattern of the plurality of the compute task patterns as an efficient or alternative compute task pattern to perform the computing function based at least in part on a number of compute tasks for performing the particular compute task pattern;

provide an option to execute the efficient or alternative compute task pattern to perform the computing function; and enable execution of the efficient or alternative compute task pattern to perform the computing function.

15. The at least one non-transitory machine readable storage medium of claim 14, wherein monitoring the one or more compute tasks is based at least in part on machine learning.

16. The at least one non-transitory machine readable storage medium of claim 14, further comprising instructions which, when executed, cause the system to identify the one or more trigger events having at least a condition or a defined context associated with the one or more compute tasks.

17. The at least one non-transitory machine readable storage medium of claim 14, further comprising instructions which, when executed, cause the system to group the one or more compute tasks into a group for scheduling based at least in part on the one or more trigger events.

18. The at least one non-transitory machine readable storage medium of claim 14, further comprising instructions which, when executed, cause the system to provide to one or more one or more devices at least one of documents, electronic communication, files, or programs related to the efficient or alternative compute task pattern.

19. The at least one non-transitory machine readable storage medium of claim 14, further comprising instructions which, when executed, cause the system to:

accept an automation option using a voice command executed at a voice capturing endpoint to execute the efficient or alternative compute task pattern, wherein the voice command is associated with a customer account; or provide the automation option as a graphical user interface (GUI) control to execute the efficient or alternative compute task pattern.

20. The at least one non-transitory machine readable storage medium of claim 14, wherein the one or more trigger events comprise initiating one or more of: recording a conference call, transcribing the conference call, sending a travel arrangements email, sending a transcribed conference call email, scheduling a meeting, or sending meeting directions.

* * * * *